US010429405B2

(12) United States Patent
Savchenko et al.

(10) Patent No.: US 10,429,405 B2
(45) Date of Patent: Oct. 1, 2019

(54) VIBRATING BEAM ACCELEROMETER

(75) Inventors: Arthur Savchenko, Morristown, NJ (US); Fred Petri, Snohomish, WA (US)

(73) Assignee: Honeywell International Inc., Morris Plains, NJ (US)

( * ) Notice: Subject to any disclaimer, the term of this patent is extended or adjusted under 35 U.S.C. 154(b) by 2140 days.

(21) Appl. No.: 13/365,574

(22) Filed: Feb. 3, 2012

(65) Prior Publication Data

US 2013/0204571 A1 Aug. 8, 2013

(51) Int. Cl.
*G01P 15/097* (2006.01)

(52) U.S. Cl.
CPC .................... *G01P 15/097* (2013.01)

(58) Field of Classification Search
CPC ...................................... G01P 15/097
USPC .......................... 702/141; 73/514.01, 514.36
See application file for complete search history.

(56) References Cited

U.S. PATENT DOCUMENTS

| | | | |
|---|---|---|---|
| 4,258,572 A | 3/1981 | Loper, Jr. | |
| 4,912,990 A * | 4/1990 | Norling | 73/862.59 |
| 5,331,242 A * | 7/1994 | Petri | 310/370 |
| 5,501,103 A * | 3/1996 | Woodruff et al. | 73/514.29 |
| 5,623,098 A * | 4/1997 | Castleman et al. | 73/497 |
| 7,950,281 B2 * | 5/2011 | Hammerschmidt | 73/504.04 |
| 2005/0056095 A1 | 3/2005 | Tomikawa et al. | |
| 2005/0091843 A1 | 5/2005 | Yu | |
| 2005/0160816 A1 * | 7/2005 | Yu | 73/514.29 |

FOREIGN PATENT DOCUMENTS

| | | |
|---|---|---|
| JP | H04361165 A | 12/1992 |
| JP | H09096552 A | 4/1997 |
| JP | 2009156831 A | 7/2009 |

OTHER PUBLICATIONS

Tudor et al., "Resonant Microsensors: Fundamentals and State of the Art", Sensor and Materials (1997).*
Chen et al., An Electromagnetically Excited Silicon Nitride Beam Resonant Accelerometer, Open Access Sensors ISSN 1424-8220, www.mdpi.com/journal/sensors, Sensors 2009, 9, 1330-1338, doi: 10.3390/s90301330, Feb. 2009.
Search Report from counterpart European application No. 12194496.1, dated May 10, 2013, 3 pp.
Examination Report from counterpart European application No. 12194496.1, dated May 23, 2013, 5 pp.
Response to Examination Report dated May 23, 2013, from counterpart European application No. 12194496.1, filed on Sep. 2, 2013, 13 pp.
Notification of Reasons for Refusal, and translation thereof, from counterpart JP Patent No. 2012-261042, dated Jun. 6, 2017, 6 pp.
Office Action, and translation thereof, from counterpart Japanese Application No. 2012-261042, dated Jul. 27, 2016, 5 pp.

\* cited by examiner

*Primary Examiner* — Hyun D Park
(74) *Attorney, Agent, or Firm* — Shumaker & Sieffert, P.A.

(57) ABSTRACT

Systems and methods for improving common mode cancelation in a vibrating beam accelerometer (VBA) by using multiple resonant modes. The VBA includes two double-ended tuning forks (DETF). Additional oscillators drive the DETFs into the extra resonant modes. This increases common mode rejection from two modes to four modes. In addition the scale factor of the additional mode may provide a greater scale factor than prior designs.

9 Claims, 3 Drawing Sheets

VIBRATING BEAM ACCELEROMETER

GOVERNMENT INTEREST

The invention described herein was made in the performance of work under U.S. Government Contract No. FA9453-05-C-0241 awarded by Air Force Research Laboratories. The Government has certain rights to portions of this invention.

BACKGROUND OF THE INVENTION

Vibrating beam accelerometer (VBA) devices use two dual beam resonators that operate in an in-plane, out-of-phase mode. The difference between the two resonator frequencies is used to measure force or acceleration. The sum of the resonator frequencies is use to track extraneous forces created by temperature, radiation, humidity, aging, static charge, etc. This difference is typically called common mode, which is used to reduce non acceleration (g) errors. For some applications this does not provide sufficient accuracy.

SUMMARY OF THE INVENTION

The present invention provides systems and methods for improving common mode cancelation in a vibrating beam accelerometer (VBA) by using multiple resonant modes. The VBA includes two double-ended tuning forks (DETF). Additional oscillators drive the DETFs into the extra resonant modes. This increases common mode rejection from two modes to four modes. In addition the scale factor of the additional mode may provide a greater scale factor than prior designs.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
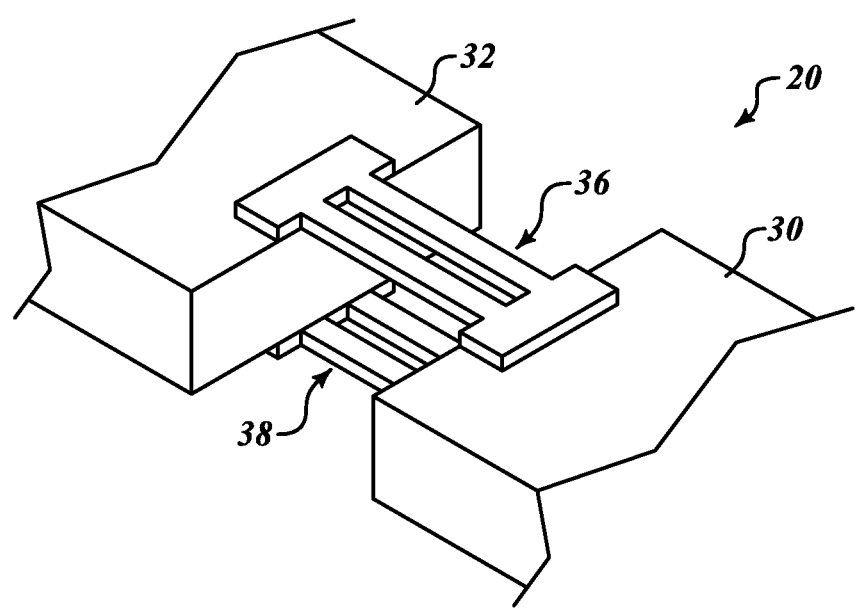
FIG. 1 is a partial perspective view of an exemplary vibrating beam accelerometer (VBA) formed in accordance with an embodiment of the present invention.

FIG. 1 is a partial perspective view of an exemplary vibrating beam accelerometer (VBA) 20 that provides improved common mode cancellation. The VBA 20 includes a proof mass 30 connected to a base section 32 via a flexure (not shown). Two double-ended tuning forks (DETFs) 36, 38 are attached between the proof mass 30 and the base section 32. One DETF 36 is attached to a top of the proof mass 30 and the base section 32 and the other DETF 38 is attached to a bottom of the proof mass 30 and the base section 32. The DETFs 36, 38 are designed to resonant at different frequencies. The DETFs 36, 38 are driven at two different resonant modes (e.g. mode 1 and 3), thereby producing output signals in the two resonant modes but at slightly different frequencies in order to avoid interference between the modes. These outputted signals are used to produce a force/acceleration signal having greater common mode rejection, such as temperature, radiation, humidity, aging, static charge, and other common mode anomalies.

Figure 2:
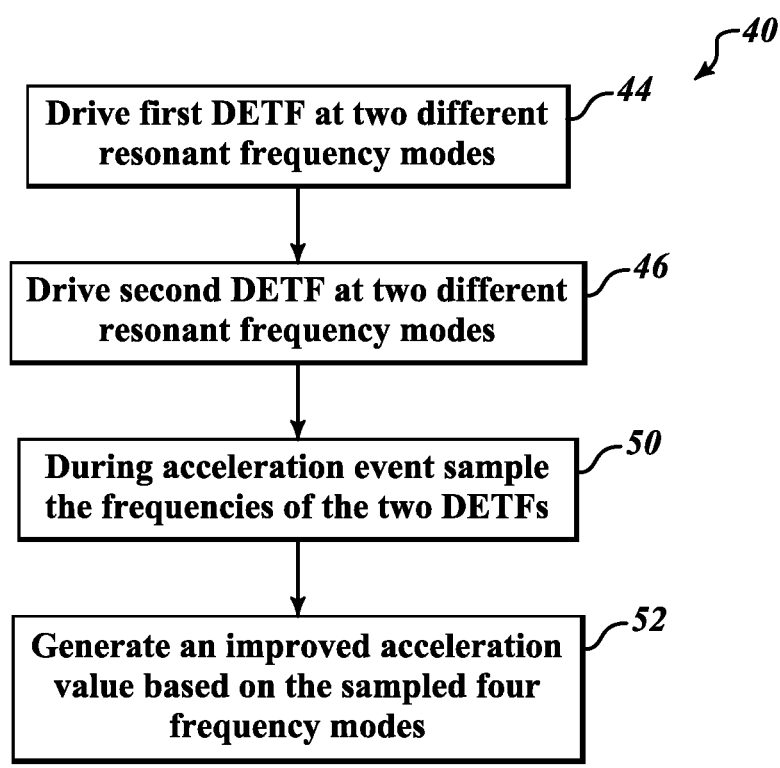
FIG. 2 is a flowchart of an exemplary process for operating the VBA shown in FIG. 1.

FIG. 2 illustrates a flowchart of an exemplary process 40 used to operate the VBA 20. First at a block 44, the first DETF 36 is driven at two different resonant modes. Simultaneously at a block 46, the second DETF 38 is also driven at two different resonant modes. Frequencies used to drive the two resonant modes of the second DETF 38 are different than the frequencies used to drive the two resonant modes of the second DETF 36. The two resonant modes are the same—e.g. mode 1 and 3. Other resonant mode may be used.

At a block 50, during an acceleration event (i.e., a moment when a sensor reading is desired), a sample of the resonant frequencies for the two modes for each DETF 36, 38 is taken. At a block 52, an improved acceleration value is generated based on the four sampled resonant frequencies. A more detailed example is shown below.

Figure 3:
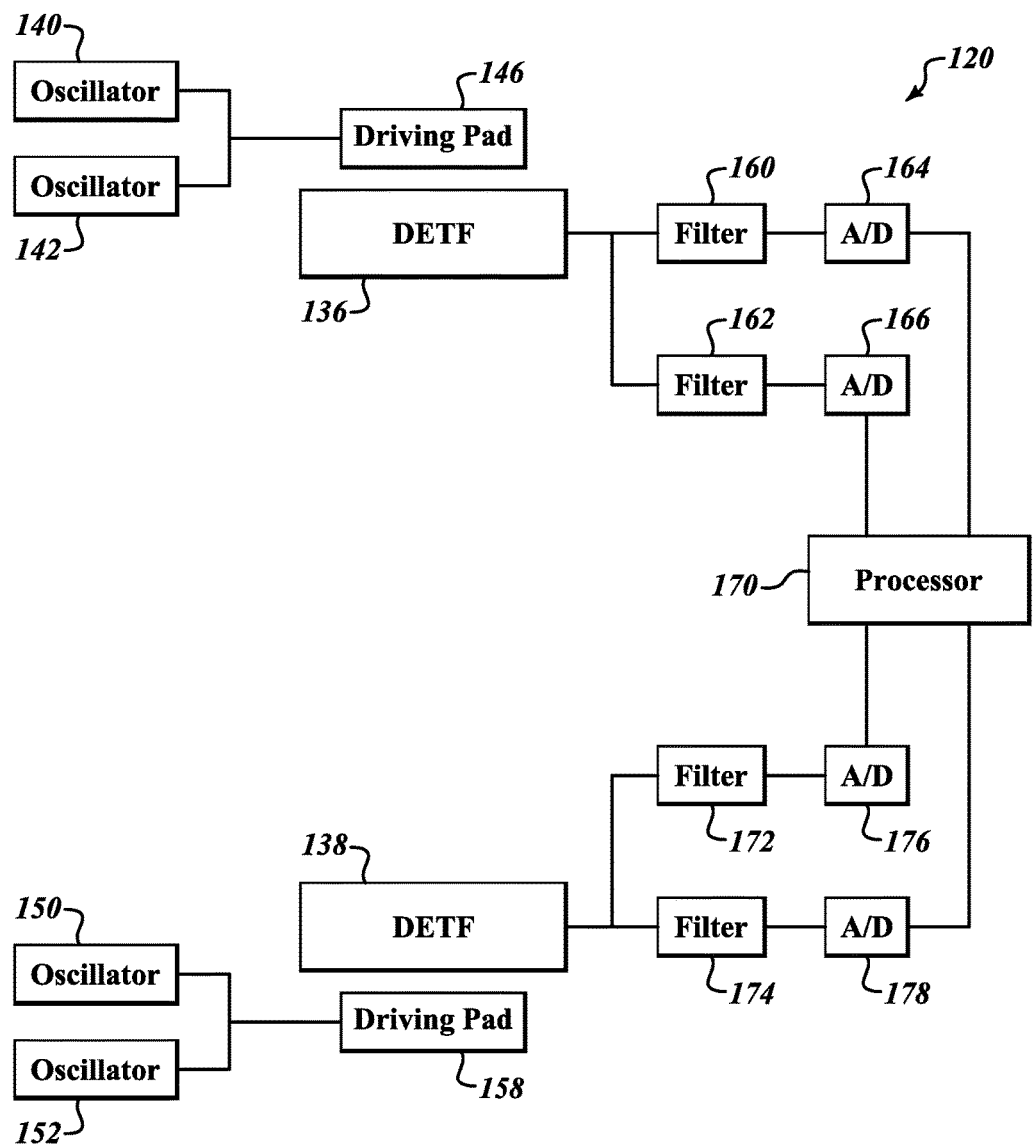
FIG. 3 is a block diagram of an exemplary system for performing the process shown in FIG. 2.

FIG. 3 is a block diagram of an exemplary VBA system 120. The system 120 includes two DETFs 136, 138. In one embodiment, the DETFs 136, 138 include a pattern of electrodes on the tines of the DETFs 136, 138. Driving electrode pads 146, 158 are located adjacent to the electrode patterns on the DETFs 136, 138. Each of the driving electrode pads 146, 158 receive input signals from two oscillators 140, 142, 150, 152. The first oscillators 140, 150 provide first signals to the pads 146, 158 that cause the DETFs 136, 138 to oscillate at a first resonant mode. The second oscillators 142, 152 provide second signals to the pads 146, 158 that cause the DETFs 136, 138 to oscillate at a second resonant mode. The frequencies of the first signals are different and the frequencies of the second signals are different. The DETFs 136, 138 are configured (e.g., slightly different beam widths) to resonate at slightly different frequencies.

Each of the analog signals outputted by the DETFs 36, 38 are filtered by two bandpass filters 160, 162, 172, 174. The bandpass filters 160, 162, 172, 174 are chosen according to the two resonant frequency modes experienced by the DETFs 136, 138. Outputs from the filters 160, 162, 172, 174 are turned into digital frequency values by analog-to-digital converters (ADC) with digital counters 164, 166, 176, 178. The generated digital frequency values are then sent to a processor 170. The processor 170 generates an acceleration value based on the digital frequency values and predefined coefficients that are prestored in system memory 180.

In one embodiment, consider the following:
the first mode output of the A/D 164 as $f_{11}$
the second mode output of the A/D 166 as $f_{12}$
the first mode output of the A/D 176 as $f_{21}$
the second mode output of the A/D 178 as $f_{22}$.

The processor 170 performs the following operations on the digital frequency values:

$$F_{mod1} = a*f_{11} + b*af_{12}$$

$$F_{mod2} = c*f_{21} + d*af_{22}$$

Common Mode Acceleration estimate $= u*F_{mod1} + v*F_{mod2} + q$.

The coefficients a, b, c, d, u, v, q are tabulated calibration coefficients, stored in the system memory 180. In one embodiment, the coefficients are determined in a set of calibration tests, prior to connecting instrument to the system 20. In one embodiment, an initial guess to the values of these coefficients is made and a Kalman filter is used to adapt those values over the course of calibration tumble tests.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system comprising:
a first resonator coupled between a proof mass and a support base on a first side of the proof mass and the support base;
a second resonator coupled between the proof mass and the support base on a second side of the proof mass and the support base, wherein the first and second resonators comprise double-ended tuning forks (DETFs);
a first oscillator configured to generate a first drive signal at a first frequency based on a first resonant mode of the first resonator;
a second oscillator configured to generate a second drive signal at a second frequency based on a second resonant mode of the first resonator;
a third oscillator configured to generate a third drive signal at a third frequency based on a first resonant mode of the second resonator;
a fourth oscillator configured to generate a fourth drive signal at a fourth frequency based on a second resonant mode of the second resonator;
a first drive mechanism configured to cause the first resonator to resonate at the first and second resonant modes based on the generated first and second drive signals;
a second drive mechanism configured to cause the second resonator to resonate at the first and second resonant modes based on the generated third and fourth drive signals; and
a processing device configured to generate an acceleration value based on signals outputted by the first and second resonators.

2. The system of claim 1, wherein the first and third frequencies are different and the second and fourth frequencies are different.

3. The system of claim 2, further comprising:
a first bandpass filter configured to filter the signal outputted by the first resonator based on the first resonant mode associated with the first resonator;
a second bandpass filter configured to filter the signal outputted by the first resonator based on the second resonant mode associated with the first resonator;
a third bandpass filter configured to filter the signal outputted by the second resonator based on the first resonant mode associated with the second resonator; and
a fourth bandpass filter configured to filter the signal outputted by the second resonator based on the second resonant mode associated with the second resonator.

4. The system of claim 3, further comprising:
a first analog-to-digital converter (ADC) and digital counter configured to convert the output of the first bandpass filter to a first digital frequency;
a second analog-to-digital converter (ADC) and digital counter configured to convert the output of the second bandpass filter to a second digital frequency;
a third analog-to-digital converter (ADC) and digital counter configured to convert the output of the third bandpass filter to a third digital frequency; and
a fourth analog-to-digital converter (ADC) and digital counter configured to convert the output of the fourth bandpass filter to a fourth digital frequency.

5. The system of claim 4, wherein the processor is configured to generate the acceleration value based on the first through fourth digital frequencies.

6. The system of claim 4, wherein the processor is configured to generate the acceleration value by at least:
determining a first frequency modulation value by adding the first digital frequency multiplied by a first coefficient and the second digital frequency multiplied by a second coefficient;
determining a second frequency modulation value by adding the third digital frequency multiplied by a third coefficient and the fourth digital frequency multiplied by a fourth coefficient;
determining a first value by multiplying the first frequency modulation value by a fifth coefficient;
determining a second value by multiplying the second frequency modulation value by a sixth coefficient; and
adding the first value, the second value, and a seventh coefficient, wherein the coefficients are stored calibration coefficients.

7. A method comprising:
using a first oscillator, driving a first resonator to resonate at a first resonant mode, wherein driving the first resonator to resonate at the first resonant mode comprises generating, by the first oscillator, a first drive signal at a first frequency;
using a second oscillator, driving the first resonator to resonate at a second resonant mode, wherein driving the first resonator to resonate at the second resonant mode comprises generating, by the second oscillator, a second drive signal at a second frequency;
using a third oscillator, driving a second resonator to resonate at the first resonant mode, wherein driving the second resonator to resonate at the first resonant mode comprises generating, by the third oscillator, a third drive signal at a third frequency;
using a fourth oscillator, driving the second resonator to resonate at the second resonant mode, wherein driving the second resonator to resonate at the second resonant mode comprises generating, by the fourth oscillator, a fourth drive signal at a fourth frequency,
wherein the first and second resonators comprise double-ended tuning forks (DETFs), and
wherein the first frequency is different from the third frequency and the second frequency is different from the fourth frequency;
filtering, with a first bandpass filter, the signal outputted by the first resonator based on the first resonant mode associated with the first resonator;
filtering, with a second bandpass filter, the signal outputted by the first resonator based on the second resonant mode associated with the first resonator;
filtering, with a third bandpass filter, the signal outputted by the second resonator based on the first resonant mode associated with the second resonator; and
filtering, with a fourth bandpass filter, the signal outputted by the second resonator based on the second resonant mode associated with the second resonator;
at a first analog-to-digital converter (ADC) and digital counter, converting the output of the first bandpass filter to a first digital frequency;
at a second analog-to-digital converter (ADC) and digital counter, converting the output of the second bandpass filter to a second digital frequency;

at a third analog-to-digital converter (ADC) and digital counter, converting the output of the third bandpass filter to a third digital frequency; and at a fourth analog-to-digital converter (ADC) and digital counter, converting the output of the fourth bandpass filter to a fourth digital frequency; and at a processing device, generating an acceleration value based on signals outputted by the first and second resonators.

8. The method of claim 7, further comprising, at the processor, generating the acceleration value based on the first through fourth digital frequencies.

9. The method of claim 7, wherein generating the acceleration value comprises:

determining a first frequency modulation value by adding the first digital frequency multiplied by a first coefficient and the second digital frequency multiplied by a second coefficient;

determining a second frequency modulation value by adding third digital frequency multiplied by a third coefficient and the fourth digital frequency multiplied by a fourth coefficient;

determining a first value by multiplying the first frequency modulation value by a fifth coefficient;

determining a second value by multiplying the second frequency modulation value by a sixth coefficient; and adding the first value, the second value, and a seventh coefficient, wherein the coefficients are stored calibration coefficients.

* * * * *